United States Patent
Behrens

(10) Patent No.: US 9,029,274 B2
(45) Date of Patent: May 12, 2015

(54) CONTINUOUS ANNULAR BALER PRESS BELT AND METHOD FOR THE PRODUCTION THEREOF

(75) Inventor: Carsten Behrens, Bilshausen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 215 days.

(21) Appl. No.: 13/228,726

(22) Filed: Sep. 9, 2011

(65) Prior Publication Data

US 2012/0015572 A1 Jan. 19, 2012

Related U.S. Application Data

(63) Continuation of application No. PCT/EP2010/050431, filed on Jan. 15, 2010.

(30) Foreign Application Priority Data

Mar. 9, 2009 (DE) .......................... 10 2009 003 588

(51) Int. Cl.
| | | |
|---|---|---|
| *A01F 15/18* | (2006.01) | |
| *B65G 15/34* | (2006.01) | |
| *B32B 5/26* | (2006.01) | |
| *B32B 25/10* | (2006.01) | |
| *B32B 27/02* | (2006.01) | |
| *B32B 27/34* | (2006.01) | |
| *B32B 27/36* | (2006.01) | |

(52) U.S. Cl.
CPC ................ *B65G 15/34* (2013.01); *A01F 15/18* (2013.01); *A01F 2015/183* (2013.01); *B32B 5/26* (2013.01); *B32B 25/10* (2013.01); *B32B 27/02* (2013.01); *B32B 27/34* (2013.01); *B32B 27/36* (2013.01)

(58) Field of Classification Search
CPC ..... A01F 15/18; A01F 2051/183; F16G 5/00; F16G 1/10
USPC .................. 428/57, 58; 442/59; 474/260–265
See application file for complete search history.

(56) References Cited

U.S. PATENT DOCUMENTS

| | | | | |
|---|---|---|---|---|
| 2,801,452 | A | * | 8/1957 | Adams, Jr. ........................ 24/38 |
| 3,369,586 | A | * | 2/1968 | Gottauf ......................... 152/367 |
| 3,664,907 | A | * | 5/1972 | Price ............................... 428/57 |
| 4,708,702 | A | * | 11/1987 | Robecchi et al. ............. 474/261 |
| 4,972,770 | A | | 11/1990 | Berkers |
| 2008/0105517 | A1 | | 5/2008 | Belik et al. |

FOREIGN PATENT DOCUMENTS

| | | |
|---|---|---|
| DE | 31 07 744 A1 | 9/1982 |
| DE | 32 34 455 A1 | 3/1984 |
| DE | 3303773 * | 8/1984 |
| DE | 102 43 727 C1 | 7/2003 |
| DE | 698 30 206 T2 | 2/2006 |

OTHER PUBLICATIONS

International Search Report dated Aug. 12, 2010 of international application PCT/EP 2010/050431 on which this application is based.

\* cited by examiner

*Primary Examiner* — Jennifer Chriss
*Assistant Examiner* — Camie Thompson
(74) *Attorney, Agent, or Firm* — Walter Ottesen P.A.

(57) ABSTRACT

A rubber continuous annular baler press belt is made of at least one of rubber and rubber-like materials. The press belt includes an embedded core of a reinforcing fabric and has at least two individual superimposed fabric layers (6, 7, 8). The ends of each fabric layer mutually abut and do not overlap each other at the abutment location. The abutment locations (11, 13, 15) are arranged over the periphery of the press belt so as to be offset from each other.

3 Claims, 1 Drawing Sheet

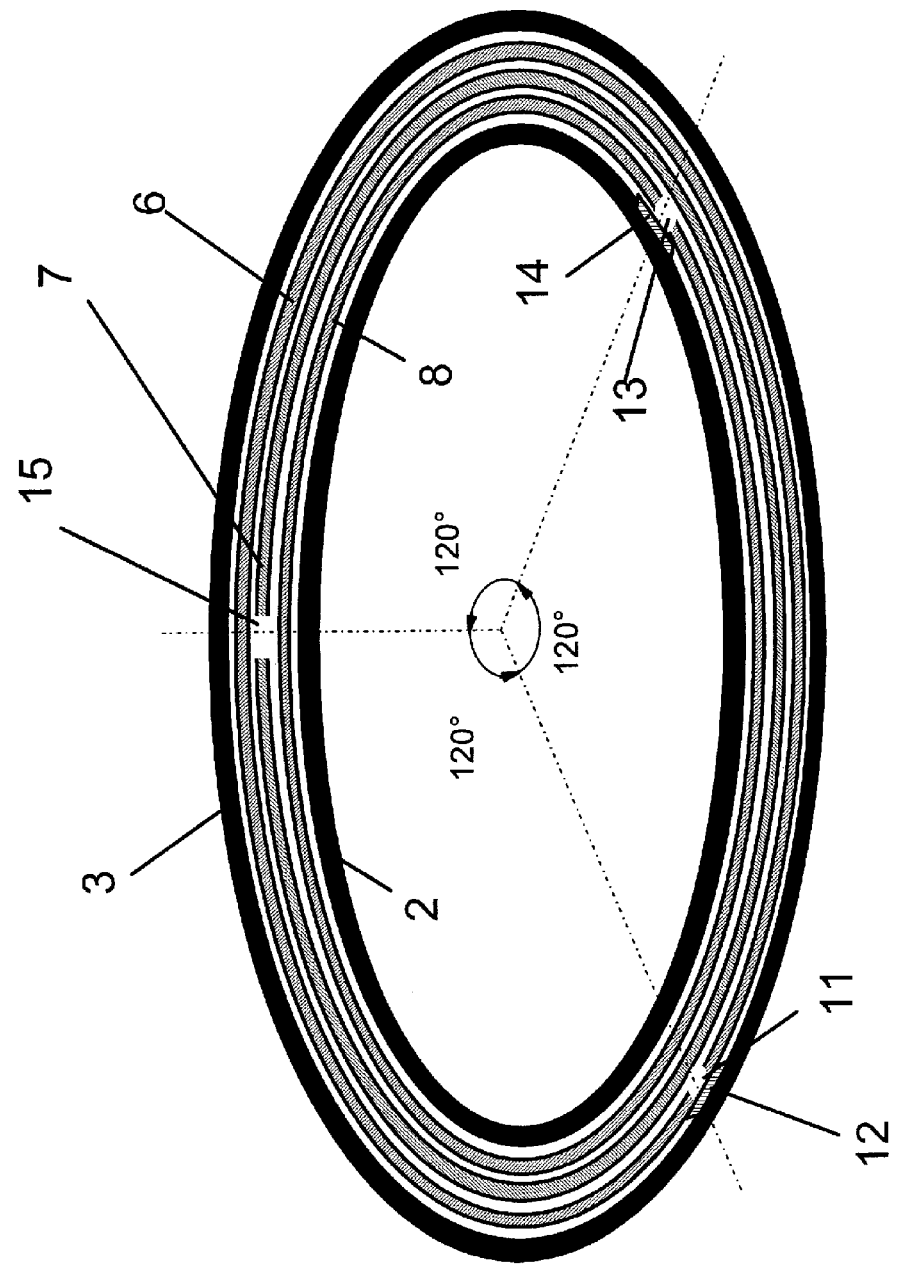

CONTINUOUS ANNULAR BALER PRESS BELT AND METHOD FOR THE PRODUCTION THEREOF

CROSS REFERENCE TO RELATED APPLICATIONS

This application is a continuation application of international patent application PCT/EP 2010/050431, filed Jan. 15, 2010, designating the United States and claiming priority from German application 10 2009 003 588.5, filed Mar. 9, 2009, and the entire content of both applications is incorporated herein by reference.

FIELD OF THE INVENTION

The invention relates to a continuous round baler press belt.

BACKGROUND OF THE INVENTION

DE 102 43 727 C1 discloses an annular baler press belt having reinforcing fabric which is embedded between the rubber covering sheets and is wound from a single rubberized fabric web. As a result of the winding, the fabric web forms, depending on the number of winds, two or more fabric layers lying one atop the other peripherally. The rubberized fabric web with a small thickness is wound over the peripheral length of the annular baler press belt which is provided, until the envisaged number of layers of the fabric reinforcement of the baler press belt is reached, with the result that a continuous fabric belt is obtained immediately. The fabric belt can contain two or more fabric layers.

The two ends of the wound fabric web are cut obliquely with respect to the longitudinal direction of the web and are connected with their ends in an adhering fashion without overlapping one another with the fabric winding on, in each case, one outer side of the winding. Covering strips are applied on the cut, adhered ends. The inner covering strip can be applied by hand. The covering strips preferably have the same oblique angle as the cut web ends.

The covering strips which are attached, on one hand, to the web ends and, on the other hand, to the fabric bonding, are composed of fabric in the form of webbing, for example polyamide fabric in the form of webbing. The open webbing structure of the covering fabric permits the connecting rubber layer of the fabric web to be connected to the outer rubber covering sheets which are applied thereon.

After the lower and the upper rubber covering sheets have been subsequently applied to the continuous fabric winding, this being the fabric core, the continuous belt blank which is produced or assembled is vulcanized. In this context, the rubber covering sheets are connected to the wound fabric core, which is often also referred to by the term carcass. This produces a continuously wound baler press belt, which has proven advantageous in use.

However, the annular baler press belt has a connecting region which is defined by the web ends and which has the effect of reducing the durability owing to the bending cycles which occur during the operation of such annular baler press belts. The carcass is deflected out of the horizontal load plane in the connecting region and is therefore subjected to additional bending loads and additional stretching in the region of the ends of the fabric belt.

In the region of the ends of the fabric belt, a notch occurs in the connecting region. Under dynamic loading, this notch gives rise to peak stresses which the bonding rubber has to withstand. As a result, the requirements which are made of the bonding rubber in terms of material are determined mainly by the configuration of the connection, and considerable potential savings could be achieved in the field of material quality and heating times and run-through times given a configuration of the connection which is subject to less loading.

Given a relatively low winding number of two or three windings or layers, considerable increases in thickness occur in the connecting region with respect to the actual core thickness. This also leads to an increase in the notch sensitivity. The dynamic endurance strength of the connection is not sufficient for many applications.

DE 698 30 206 T2 (EP 1 175 358 B1 and WO 00/35785) discloses a transport belt having a reinforcing core (carcass) which is composed of three fabric layers. Bonding rubber layers are arranged between three fabric layers which lie one atop the other. The two outer fabric layers are covered by outer rubber covering sheets. A belt material is produced with which the continuous connections have to be made, in order to produce a continuous transport belt, after the vulcanized belt material has been cut to length in a special working step and using a particular method. In this context, the web ends are mainly joined together with a hook connection.

SUMMARY OF THE INVENTION

It is an object of the invention to provide a continuous annular baler press belt of the type described above which has a higher level of stability under load and a longer service life, and can be produced more cost-effectively.

The object is achieved according to the invention in that the carcass is composed of at least two individual fabric web layers lying one atop the other, wherein the two ends of each fabric web layer abut one another and do not overlap one another, and wherein the abutment locations of the individual fabric web layers are arranged offset over the periphery of the continuous belt structure.

The invention provides an annular baler press belt whose reinforcing fabric (carcass) is not wound but instead has individual fabric web layers which are cut to length to the predetermined periphery of the continuous belt and the ends of individual fabric web layers are arranged in an abutting fashion or opposite one another with a small distance between their end faces without any mutual overlap. The abutment locations of the individual fabric web layers are arranged distributed over the periphery of the belt structure here, with the result that the fabric joints which represent a slight weakening of the continuous belt are not concentrated at a single connecting location in the continuous belt.

In one advantageous embodiment of the invention, the fabric web layers of the carcass are composed of different types of fabric. This combination of different types of fabric makes it possible to produce a carcass with different tensile load bearing properties over the cross section. For example, highly elastic types of fabric can be used in the outer region, which types of fabric are adjoined by low-elongation fabric layers in the region of the neutral phase.

In a further advantageous embodiment of the invention, the fabric web layers are composed of types of fabric with different mechanical properties.

One advantageous embodiment of the invention includes an embedded core which has three fabric layers each having abutment locations. The abutment locations of the fabric layers are arranged offset at 120° with respect to one another over the periphery of the continuous annular baler press belt.

The uniform distribution or offsetting of the three abutment locations over the periphery of the continuous belt leads to a low bending cycle loading and therefore to a corresponding relatively low heat due to internal friction over the entire length of the belt.

In a further advantageous embodiment of the invention, the abutment locations of the outer and inner fabric web layers are covered in an adhering fashion by covering fabric in the form of webbing in the direction of the corresponding adjacent rubber covering sheet.

The method of the invention is for making a continuous annular baler press belt made of at least one of rubber and rubber-like materials. The press belt includes an embedded core of reinforcing fabric; the embedded core having at least two individual fabric layers arranged one atop the other; each of the fabric layers having two ends; the two ends of each fabric layer mutually abutting at an abutment location so as not to overlap; the continuous annular baler press belt defining a periphery; and, the abutment locations of the individual fabric layers are arranged distributed over the periphery of the press belt. The method includes the steps of: cutting at least two fabric layers to length so that they are matched to the peripheral length of the continuous annular baler press belt to be produced; arranging the fabric layers one atop the other while peripherally offsetting the abutment locations; applying an inner and an outer rubber covering sheet; and, vulcanizing the constructed continuous belt blank.

Furthermore, it is possible to position covering strips composed of webbing fabric on the exposed abutment locations of the carcass before the inner and outer rubber covering sheets are applied and the entire continuous belt blank is vulcanized.

BRIEF DESCRIPTION OF THE DRAWING

The invention will now be described with reference to the single FIGURE of the drawing (FIG. 1) which shows a continuous annular baler press belt according to the invention.

DESCRIPTION OF THE PREFERRED EMBODIMENTS OF THE INVENTION

The annular baler press belt shown in FIG. 1 has an inner rubber covering sheet 2 and an outer rubber covering sheet 3. A fabric reinforcement structure, referred to as a carcass, is composed of three individual fabric web layers (6, 7, 8) arranged one atop the other and this carcass is arranged between these two rubber covering sheets 2 and 3. These fabric web layers (6, 7, 8) are rubberized, that is, the respective fabrics have been skimmed with bonding rubber in a coating process or a calendering process.

The ends of respective ones of the fabric web layer (6, 7, 8) are distributed uniformly at an angle of 120° when viewed over the periphery of the annular baler press belt. In this context, the ends of each fabric web layer (6, 7, 8) mutually abut, that is, the ends lie opposite one another with their end faces and do not overlap. Bonding rubber is present between the ends.

The abutment location 11 of the outer fabric web layer 6 is covered with a covering strip 12 of lattice fabric toward the outer covering sheet 3. The abutment location 13 of the fabric web 8 lying on the inside is also covered by a covering strip 14 made of lattice fabric towards the inner rubber covering sheet 2.

The abutment location 15 of the middle fabric web layer 7 does not have a covering fabric since the upper and lower fabric web layers 6 and 8 each cover the abutment location 15 of the middle fabric web layer 7.

The middle fabric web layer 7 is composed of an EP-fabric. This EP-fabric has the two materials polyester and polyamide, with polyester being arranged as the warp yarns and polyamide as the weft yarns in the fabric. The inner and outer fabric web layers 6 and 8 are each composed of a PE-fabric (polyamide/polyester). The different selections of types of fabric make it possible for the belt manufacturer to favorably influence the mechanical properties of the continuous belt. The middle EP-fabric 7 has a low-elongation characteristic, which is positive with respect to the neutral fiber of the continuous belt. The high elongation PE-fabrics 6 and 8 permit the permissible bending radius during operation to be reduced and allow the use of smaller drum diameters, while the middle EP-fabric increases the dielectric strength.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

2 Inner rubber covering sheet
3 Outer rubber covering sheet
6 Outer fabric web layer
7 Middle fabric web layer
8 Inner fabric web layer
11 Abutment location
12 Covering strip
13 Abutment location
14 Covering strip
15 Abutment location

What is claimed is:

1. A continuous annular baler press belt made of at least one rubber material comprising:
    an inner rubber cover sheet and an outer rubber cover sheet;
    an embedded core of reinforcing fabric arranged between said inner and outer rubber cover sheets;
    said embedded core having first, second and third individual fabric layers skimmed with bonding rubber and being arranged one atop the other to define a carcass;
    said first individual fabric layer being next to said inner rubber cover sheet and said third individual fabric layer being next to said outer rubber cover sheet;
    said second individual fabric layer being sandwiched between said first and third individual fabric layers;
    each of said fabric layers having two ends;
    said two ends of each fabric layer mutually abutting at an abutment location so as not to overlap;
    the continuous annular baler press belt defining a periphery;
    the abutment locations of said individual fabric layers being completely separate from each other and being arranged distributed over said periphery of the press belt;
    said individual fabric layers being made of different types of fabric;
    said abutment locations of said three fabric layers being arranged offset at 120° with respect to one another over said periphery of the continuous annular baler press belt;
    a first covering strip interposed between said first individual fabric layer and said inner rubber covering sheet so as to cover only the abutment location of said first individual fabric layer;
    a second covering strip interposed between said third individual fabric layer and said outer rubber covering sheet so as to cover only the abutment location of said third individual fabric layer; and, the abutment location of said second individual fabric layer being disposed directly between said first and said third individual fabric layers so as to cause said first and third individual fabric layers to conjointly define a covering therefor.

2. The continuous annular baler press belt of claim 1, wherein said individual fabric layers made of different types of fabric have different mechanical characteristics.

3. The continuous annular baler press belt of claim 1, wherein said individual fabric layers made of different types of fabric are made of different fabric materials.

* * * * *